(12) United States Patent
Swanson et al.

(10) Patent No.: US 7,987,348 B2
(45) Date of Patent: Jul. 26, 2011

(54) INSTANT ON VIDEO

(75) Inventors: Robert C. Swanson, Olympia, WA (US); Michael A. Rothman, Puyallup, WA (US); Mallik Bulusu, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 825 days.

(21) Appl. No.: 11/731,525

(22) Filed: Mar. 30, 2007

(65) Prior Publication Data
US 2008/0244250 A1 Oct. 2, 2008

(51) Int. Cl.
G06F 9/24 (2006.01)
G06F 15/177 (2006.01)
G06F 13/00 (2006.01)

(52) U.S. Cl. ............. 713/1; 713/2; 711/153; 711/154

(58) Field of Classification Search .............. 713/1, 2; 711/153, 154
See application file for complete search history.

(56) References Cited

U.S. PATENT DOCUMENTS

| | | | |
|---|---|---|---|
| 5,809,531 A * | 9/1998 | Brabandt | 711/141 |
| 6,195,749 B1 * | 2/2001 | Gulick | 713/1 |
| 6,374,338 B1 * | 4/2002 | Garvey | 711/170 |
| 6,477,642 B1 * | 11/2002 | Lupo | 713/2 |
| 6,487,656 B1 | 11/2002 | Kim et al. | |
| 6,704,840 B2 * | 3/2004 | Nalawadi et al. | 711/118 |
| 6,963,344 B1 * | 11/2005 | Kasprzak et al. | 345/543 |
| 7,370,186 B1 * | 5/2008 | Lilliebjerg | 713/1 |
| 2003/0023812 A1 * | 1/2003 | Nalawadi et al. | 711/118 |
| 2003/0188173 A1 * | 10/2003 | Zimmer et al. | 713/189 |
| 2003/0195995 A1 * | 10/2003 | Tabbara | 709/313 |
| 2004/0098575 A1 | 5/2004 | Datta et al. | |
| 2004/0103272 A1 * | 5/2004 | Zimmer et al. | 713/1 |
| 2004/0221150 A1 | 11/2004 | Maynard et al. | |
| 2004/0236567 A1 | 11/2004 | Rothman et al. | |
| 2004/0260917 A1 | 12/2004 | Edrich | |
| 2005/0015582 A1 | 1/2005 | Shida et al. | |
| 2005/0114620 A1 * | 5/2005 | Justen | 711/170 |
| 2005/0172113 A1 * | 8/2005 | Lee | 713/2 |
| 2006/0129789 A1 | 6/2006 | Chu et al. | |
| 2007/0005952 A1 * | 1/2007 | Ho | 713/2 |
| 2007/0011507 A1 * | 1/2007 | Rothman et al. | 714/718 |
| 2007/0022282 A1 | 1/2007 | Chang | |
| 2007/0050611 A1 | 3/2007 | Weikel | |
| 2007/0055856 A1 * | 3/2007 | Zimmer et al. | 713/2 |

FOREIGN PATENT DOCUMENTS

GB 2409311 A 6/2005
WO 01/42911 A2 6/2001

OTHER PUBLICATIONS

European Search Report received for European Patent Application No. 08251206.2, mailed on May 11, 2009, 9 pages.

* cited by examiner

*Primary Examiner* — Vincent T Tran
(74) *Attorney, Agent, or Firm* — Joni D. Stutman

(57) ABSTRACT

In some embodiments, the invention involves speeding boot up of a platform by initializing the video card early on in the boot process. In an embodiment, processor cache memory is to be used as cache as RAM (CAR). Video graphics adapter (VGA) card initialization uses the CAR instead of system RAM to perform initialization. A portion of the firmware code, interrupt vector tables and handlers are mirrored in the CAR, from flash memory to mimic the behavior of system RAM during the video initialization. VGA initialization may occur before system RAM has initialized to enable early visual feedback to a user. Other embodiments are described and claimed.

17 Claims, 9 Drawing Sheets

INSTANT ON VIDEO

FIELD OF THE INVENTION

An embodiment of the present invention relates generally to computing systems and, more specifically, to speeding boot up of a platform by initializing the video card early on.

BACKGROUND INFORMATION

Various mechanisms exist for booting a computing device. Servers, specifically, may be slow to boot the video components, which results in a lack of early visual feedback to a user or operator. Systems having video feedback earlier in the boot cycle appear to boot faster, and provide additional boot status to a user. Desktop and mobile systems tend to boot faster than servers. The lack of visual feedback may give the appearance that the system is not booting at all. In existing systems, desktop and mobile systems have less complicated memory subsystems than servers, and thus take less time to boot the BIOS. Server systems have more complicated memory subsystems and thus, take longer for the BIOS to initialize the memory subsystem and ultimately to boot up.

In existing systems, many tasks are required to be performed before the video subsystem can be initialized. Thus, the user is deprived of video status of the boot process until the video subsystem has booted. On average, a server may take 20-50+ seconds before video may be initialized. A user who is not familiar with the delayed video response time may think that the server has failed to boot and recycle the power button in error.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to early initialization of the video component of a platform using processor memory or cache. In at least one embodiment, the present invention is intended to take advantage of a platform having memory, or cache, coupled directly to a processor to speed up video initialization. In an embodiment, a platform configured in a point to point (pTp) architecture enables video initialization to speed up, thereby providing visual feedback to a user during boot or reset.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

An area of current technological development relates to reliability, availability, and serviceability (RAS). Current systems based on the Front Side Bus (FSB) architecture do not permit hot plug of an individual bus component. Likewise, the current systems suffer from pin limitation, due to conveying initialization values and also suffer from performing multiple warm resets due to initial Power-On Configuration (POC) values are incorrect.

Figure 1:
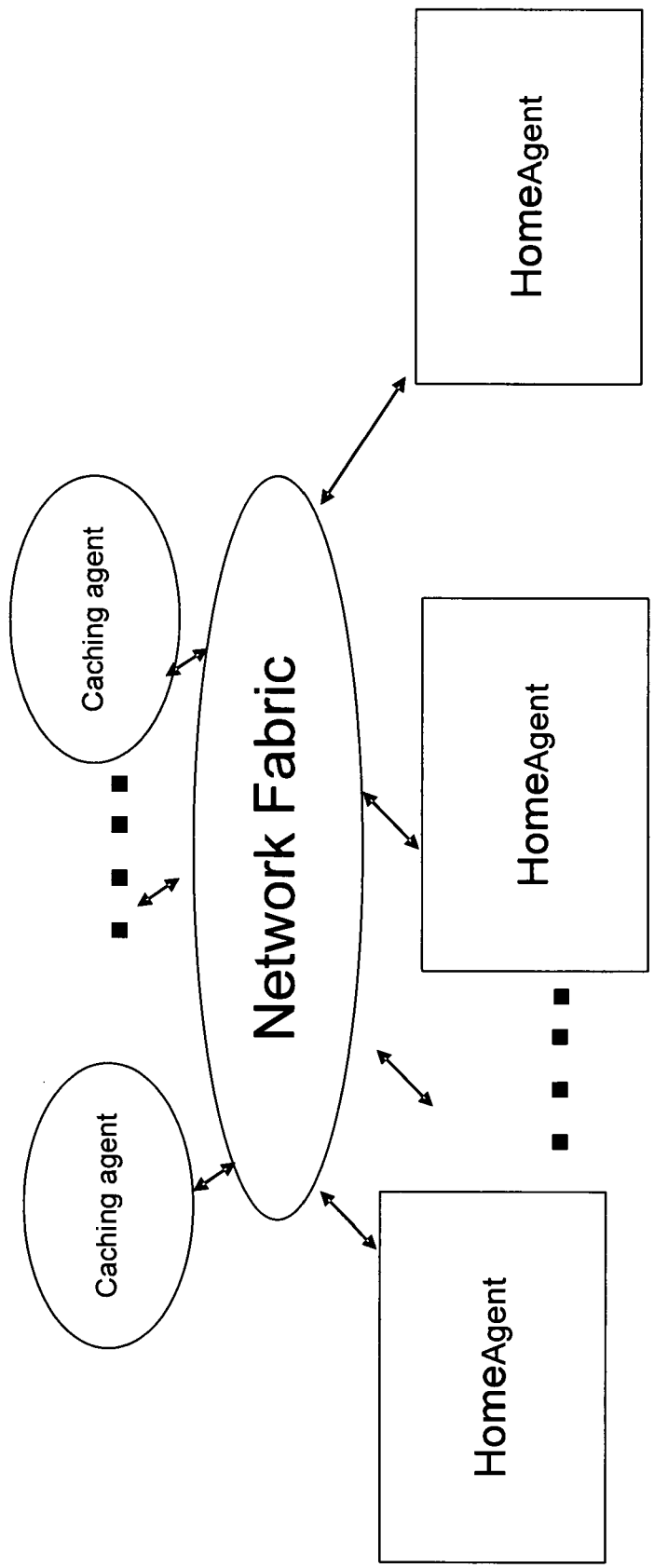
FIG. 1 is a protocol architecture as utilized by one embodiment.

In an embodiment, a point to point (pTp) architecture platform supports a layered protocol scheme, which is discussed further, below. FIG. 1 illustrates one example of a cache coherence protocol's abstract view of the underlying network.

FIG. 1 is a protocol architecture as utilized by one embodiment. The architecture depicts a plurality of caching agents and home agents coupled to a network fabric. For example, the network fabric adheres to a layered protocol scheme and may comprise either or all of: a link layer, a physical layer, a protocol layer, a routing layer, or a transport layer. The fabric facilitates transporting messages from one protocol (home or caching agent) to another protocol for a point to point network. In one aspect, the figure depicts a cache coherence protocol's abstract view of the underlying network.

Figure 2:
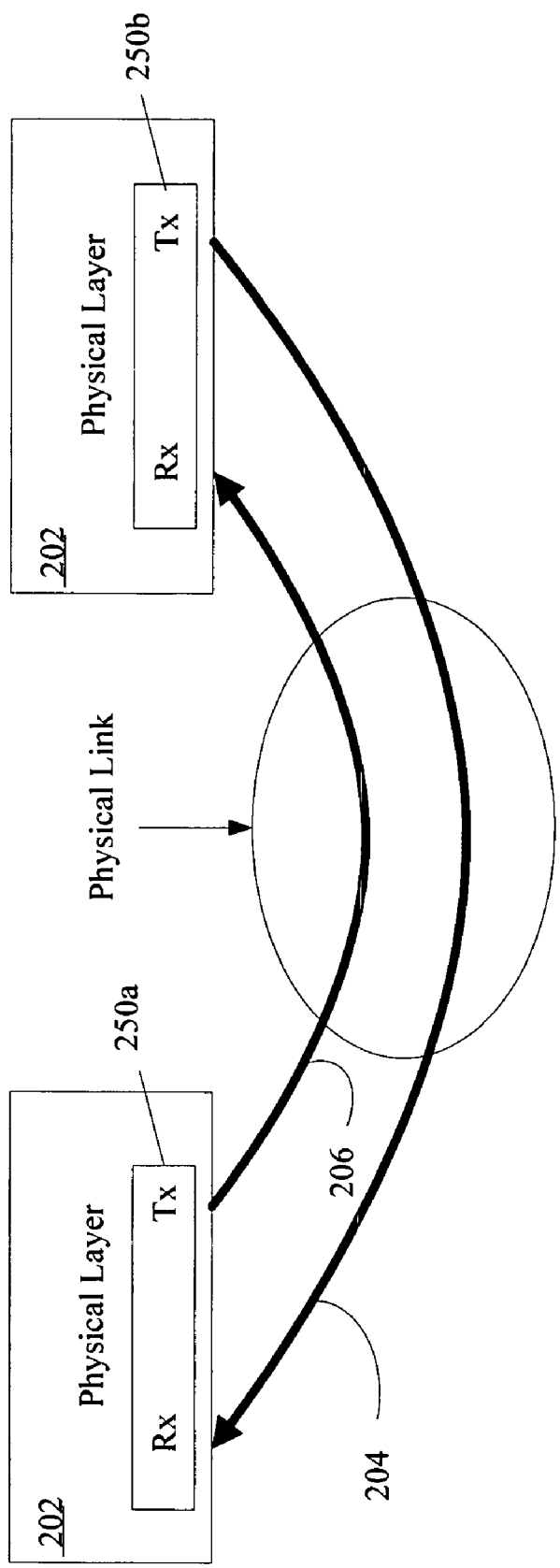
FIG. 2 is a block diagram of an apparatus for a physical interconnect utilized in accordance with the claimed subject matter.

FIG. 2 is a block diagram of an apparatus for a physical interconnect utilized in accordance with embodiments of the invention described herein. In one aspect, the apparatus depicts a physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two uni-directional links. Specifically, one uni-directional link 204 from a first transmit port 250a of a first integrated device to a first receiver port 250b of a second integrated device. Likewise, a second uni-directional link 206 from a first transmit port 250b of the second integrated device to a first receiver port 250a of the first integrated device. However, the claimed subject matter is not limited to two uni-directional links. One skilled in the art will appreciate the claimed subject matter supports any known signaling techniques, such as, bi-directional links, etc.

Figure 3B:
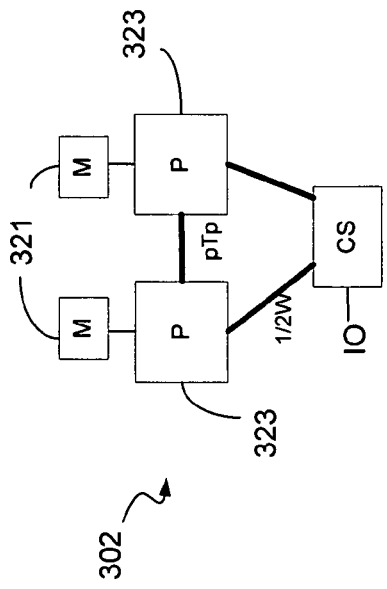
FIGS. 3A-C are multiple embodiments of a system as utilized by multiple embodiments.
Figure 3C:
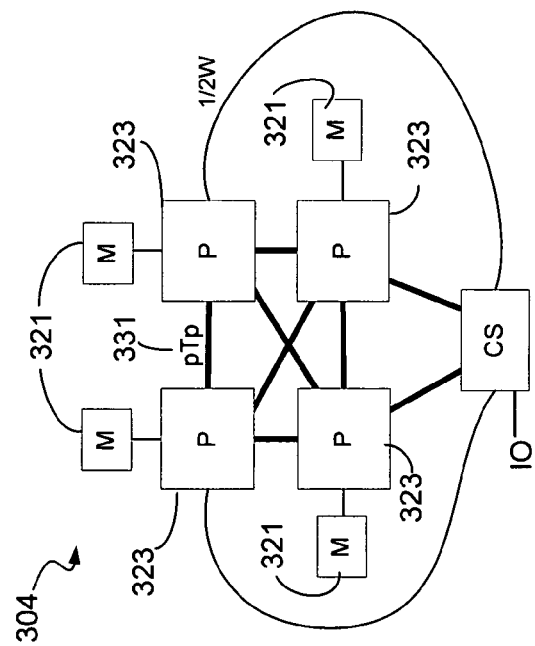
Figure 3A:
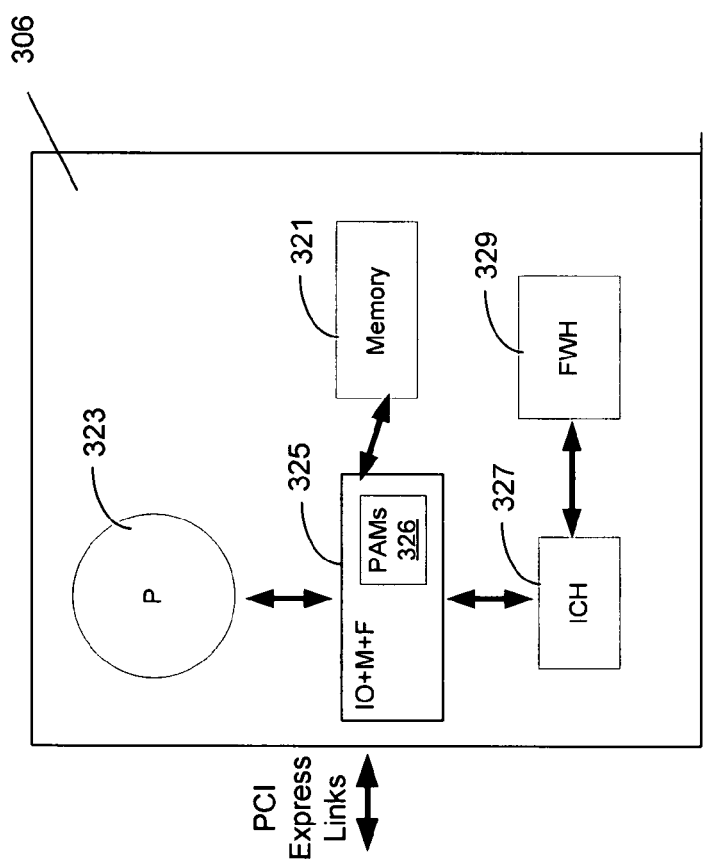

FIGS. 3A-C depict a point to point system with one or more processors. The claimed subject matter may comprise several embodiments, for instance, one with one processor 306 (FIG. 3A), one with two processors (P) 302 (FIG. 3B) and one with four processors (P) 304 (FIG. 3C). In embodiments 302 and 304, each processor is coupled to a memory (M) 321 and is connected to each processor 323 via a network fabric which may comprise either or all of: a link layer, a protocol layer, a routing layer, a transport layer, and a physical layer. The fabric facilitates transporting messages from one protocol (home or caching agent) to another protocol for a point to point network. As previously described, the system of a network fabric supports any of the embodiments depicted in connection with FIGS. 1-3.

For embodiment 306, the uni-processor P 323 is coupled to graphics and memory control 325, depicted as IO+M+F, via a network fabric link that corresponds to a layered protocol scheme. The graphics and memory control may have programmable attribute registers (PAM) to map memory accesses to the proper memory location. The graphics and memory control is coupled to memory and is capable of receiving and transmitting via peripheral component interconnect (PCI) Express Links. Likewise, the graphics and memory control is coupled to the input/output controller hub (ICH) 327. Furthermore, the ICH 327 is coupled to a firmware hub (FWH) 329 via a low pin count (LPC) bus. Also, for a different uni-processor embodiment, the processor would have external network fabric links. The processor may have multiple cores with split or shared caches with each core coupled to an X-bar router and a non-routing global links interface. An X-bar router is a pTp interconnect between cores in a socket. X-bar is a "cross-bar" meaning that every element has a cross-link or connection to every other. This is typically faster than a pTp interconnect link and implemented on-die, promoting parallel communication. Thus, the external network fabric links are coupled to the X-bar router and a non-routing global links interface.

An embodiment of a multi-processor system comprises a plurality of processing nodes 323 interconnected by a point-to-point network 331 (indicated by thick lines between the processing nodes). For purposes of this discussion, the terms "processing node" and "compute node" are used interchangeably. Links between processors are typically full, or maximum, width, and links from processors to an IO hub (IOH) chipset (CS) are typically half width. Each processing node 323 includes one or more central processors 323 coupled to an associated memory 321 which constitutes main memory of the system. In alternative embodiments, memory 321 may be physically combined to form a main memory that is accessible by all of processing nodes 323. Each processing node 323 may also include a memory controller 325 to interface with memory 321. Each processing node 323 including its associated memory controller 325 may be implemented on the same chip. In alternative embodiments, each memory controller 325 may be implemented on a chip separate from its associated processing node 323.

Each memory 321 may comprise one or more types of memory devices such as, for example, dual in-line memory modules (DIMMs), dynamic random access memory (DRAM) devices, synchronous dynamic random access memory (SDRAM) devices, double data rate (DDR) SDRAM devices, or other volatile or non-volatile memory devices suitable for server or general applications.

The system may also include one or more input/output (I/O) controllers 327 to provide an interface for processing nodes 323 and other components of system to access to I/O devices, for instance a flash memory or firmware hub (FWH) 329. In an embodiment, each I/O controller 327 may be coupled to one or more processing nodes. The links between I/O controllers 327 and their respective processing nodes 323 are referred to as I/O links. I/O devices may include Industry Standard Architecture (ISA) devices, Peripheral Component Interconnect (PCI) devices, PCI Express devices, Universal Serial Bus (USB) devices, Small Computer System Interface (SCSI) devices, or other standard or proprietary I/O devices suitable for server or general applications. I/O devices may be wire-lined or wireless. In one embodiment, I/O devices may include a wireless transmitter and a wireless transmitter receiver.

The system may be a server, a multi-processor desktop computing device, an embedded system, a network device, or a distributed computing device where the processing nodes are remotely connected via a wide-area network.

In the embodiment as shown in FIG. 3C, network 331 provides partial connectivity for processing nodes 323. Thus, every processing node 323 is directly connected to some, but perhaps not all, of the other processing nodes. A processing node 323 is connected to another processing node via a direct link or via an indirect connection (e.g., using another processor as a go-between).

A type of message carried by network 331 is a snoop message, which contains information about a memory transaction that may affect the coherency state of a data item in caches (not shown). A memory transaction refers to a transaction that requires access to any memory device 321 or any cache. When any processing node performs a memory transaction, the processing node issues a snoop message (or equivalently, snoop request) on network 321 to request all of the other processing nodes to verify or update the coherency states of the data items in their respective local caches. I/O controllers 327 also issues and receives snoop messages when performing a direct memory access (DMA). Thus, any of processing nodes 323 and I/O controllers 327 may be a requesting node for a snoop message and a destination node for another snoop message.

When a first processing node sends a snoop message to a second processing node which is not directly connected to first processing node, the first and second processing nodes use a third processing node as a forwarding node. In this scenario, a third processing node serves as a forwarding node that forwards the snoop message to both processing the first and second processing nodes. The forwarding may be performed by a fan-out mechanism which replicates the incoming snoop message and forwards the replicated messages to different destinations.

Figure 4:
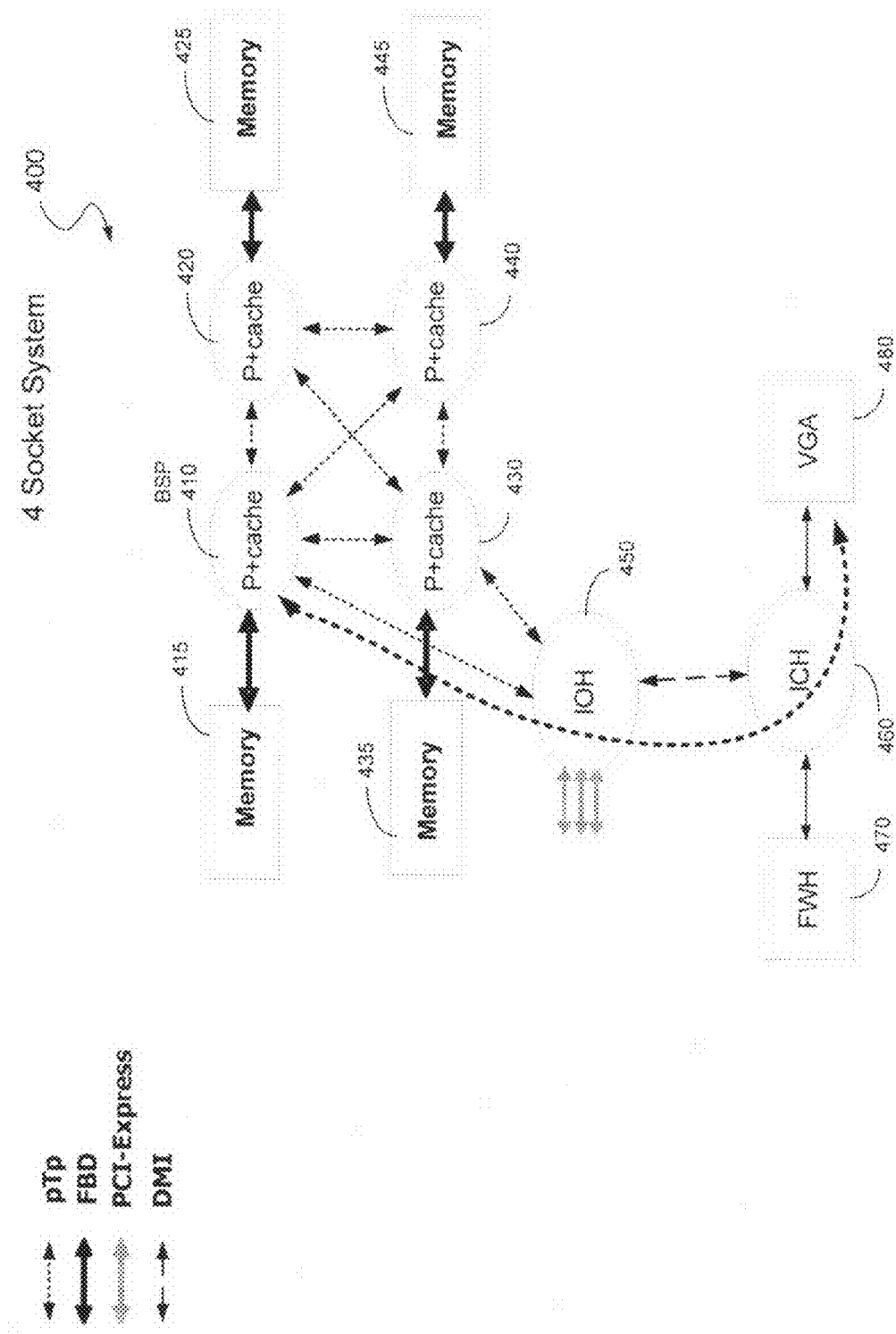
FIG. 4 illustrates a four-socket system, according to embodiments of the invention.

FIG. 4 is a block diagram illustrating a four-socket system having a point to point (pTp) interconnect architecture, according to embodiments of the invention.

Processors 410, 420, 430 and 440 may include any number of cores. Each of the processors 410, 420, 430 and 440 has a memory coupled to it, 415, 425, 435 and 445, respectively. Each processor 410, 420, 430 and 440 may also be coupled to a local cache memory. To implement embodiments of the invention, it is necessary for the boot strap processor (BSP) 410 to have a local cache memory. The dotted lines between processors indicated a pTp interconnect bus. The bolded lines between a processor and its memory indicate a FBD (fully buffered DIMM) connection. Some of the processors, 410 and 430 in this example, may be connected to an input/output hub (IOH) 450 via the pTp interconnect bus. The IOH 450 may be coupled with a number of devices (not shown) via a number of peripheral component interconnect express (PCI-e) buses, as indicated by grey lines. The IOH 450 may be coupled to the input/output controller hub (ICH) 460, via a direct media interface (DMI) bus, as shown with dashed lines. The ICH 460 may be coupled to a firmware hub (FWH) 470 and a video graphics adapter (VGA) 480.

In existing systems, video takes a long time to initialize because required resources are not available early. Specifically, video requires memory for the card to shadow and initialize. Typically, this requires waiting until memory reference code is initialized. In embodiments of the present invention, cache memory coupled to the processor is used to initialize the video. For instance, in an exemplary embodiment, processor 410 is the boot strap processor (BSP) for the platform. In this exemplary pTp architecture, processor 410 is coupled with cache memory. The amount of cache on a server processor may vary. This cache may be used as cache as RAM (CAR). In some embodiments, a server having a small cache may have 2-4 MB of cache memory that may be used as RAM. Some servers may have 25 MB of cache memory. Video initialization typically requires less than 256K of memory. In the case of using CAR, the PCI subsystem believes the cache to be physical memory on the baseboard. Cache as RAM (CAR) is more fully described in co-pending patent application publication US 2004-0103272 A1 (Ser. No. 10/306,327), entitled "Using A Processor Cache As RAM During Platform Initialization" by Vincent J. Zimmer, et al. Some of the cache memory will be set up with a dummy interrupt vector table, as necessary, for the video initialization. When the video-ROM is initialized, it assumes a zero-based interrupt vector table, for using INT10 interrupt services.

Figure 5:
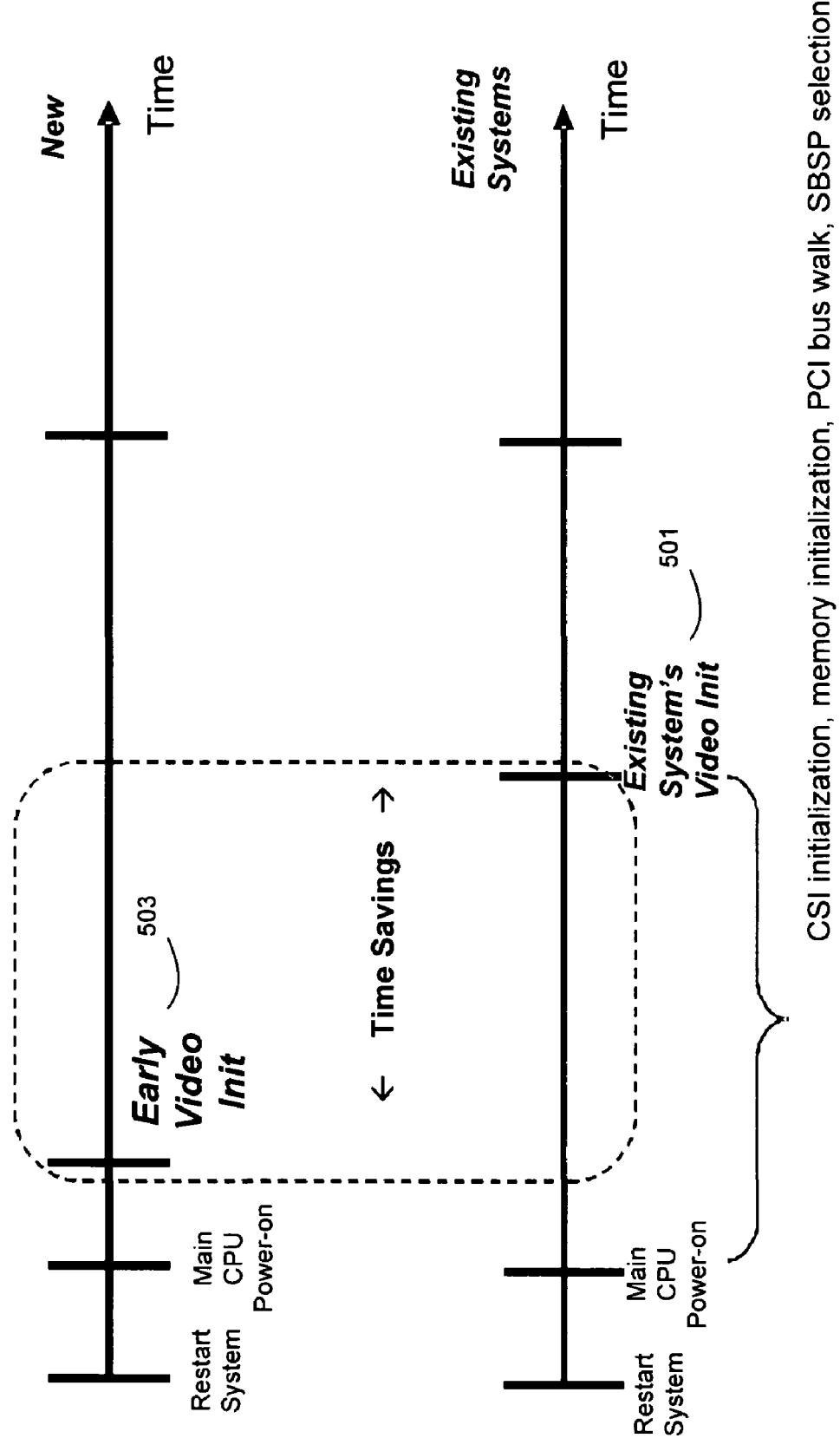
FIG. 5 illustrates the potential time savings in video initialization for embodiments of the invention.

FIG. 5 illustrates the potential time savings in video initialization for embodiments of the invention. In existing systems, the video will be fully initialized at 501. By beginning initialization of the video before RAM memory is initialized, embodiments of the invention may speed up video initialization at 503. This enables video feedback to the user. For instance, in embodiments of the invention, the user may be visually notified if system memory is not found. This is impossible in existing systems because the video cannot be initialized until after system RAM is found an initialized. In existing systems, only audible notifications, i.e., beeps, can be used to notify a user that memory has not been found.

Figure 6:
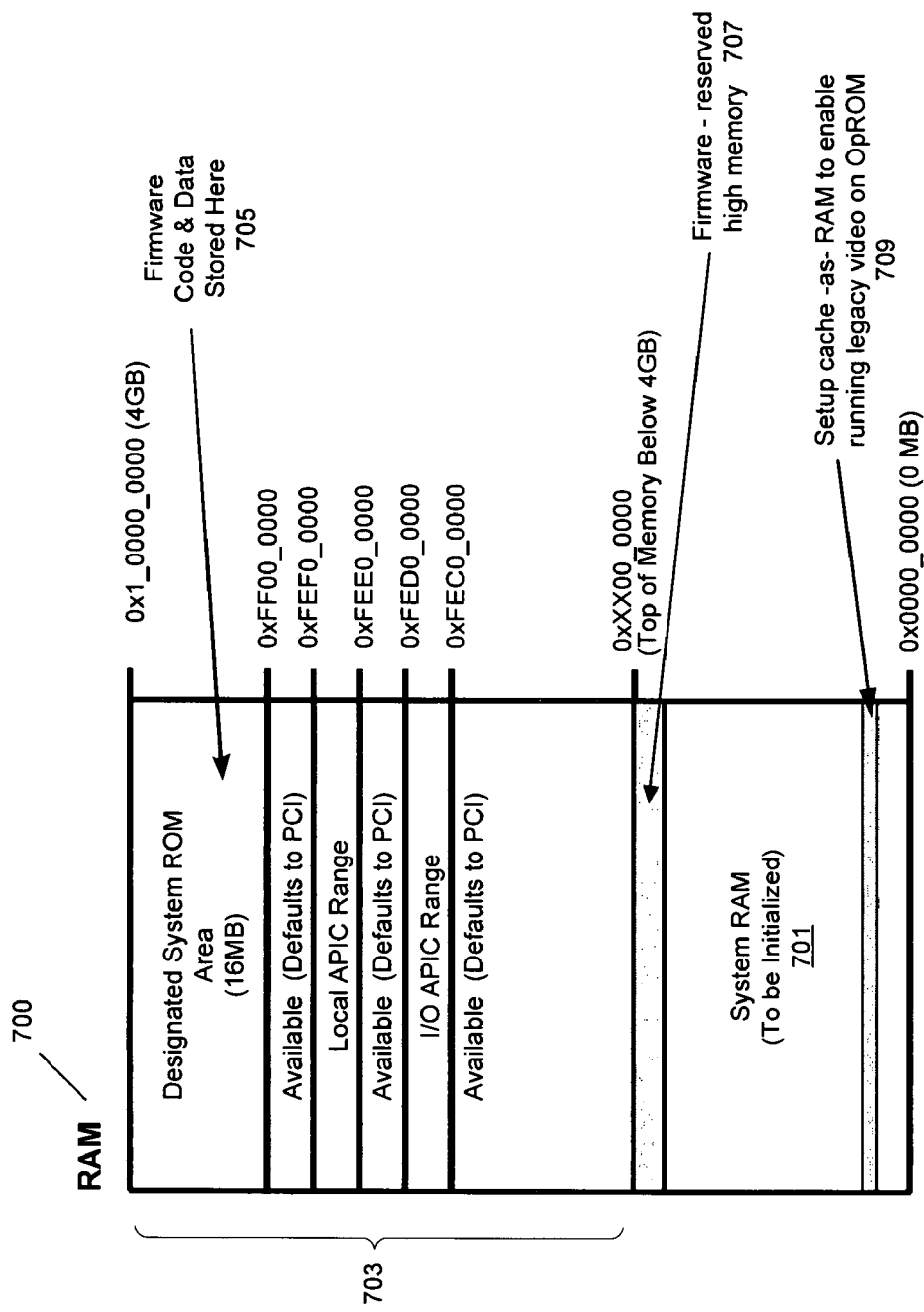
FIG. 6 is an illustration of a traditional random access memory (RAM) description showing data to be mirrored in cache as RAM (CAR), according to an embodiment of the invention.

FIG. 6 is an illustration of a traditional random access memory (RAM) 700 description. When a system first boots up, it is executing code from Flash memory (not shown). The processor does not cache the executable code, but it is typically executed straight from the firmware hub, or Flash memory. Flash memory is slower than system memory (RAM) 700 or cache memory 730. Thus, early boot operations are typically slow. In a typical system, the system RAM 700 to be initialized for general use is at 701. Upper memory 705 is reserved for designated system ROM (BIOS or firmware code) and other data required for boot. Conventional memory 703 below the firmware code may be reserved for PCI and APIC (advanced programmable interrupt controller) functions. During a typical boot, the firmware code is copied from Flash to conventional RAM 705. Memory is also typically configured with firmware reserved high memory 707. In existing systems, the video initialization must wait until system RAM 701 is initialized before it can commence.

Figure 6A:
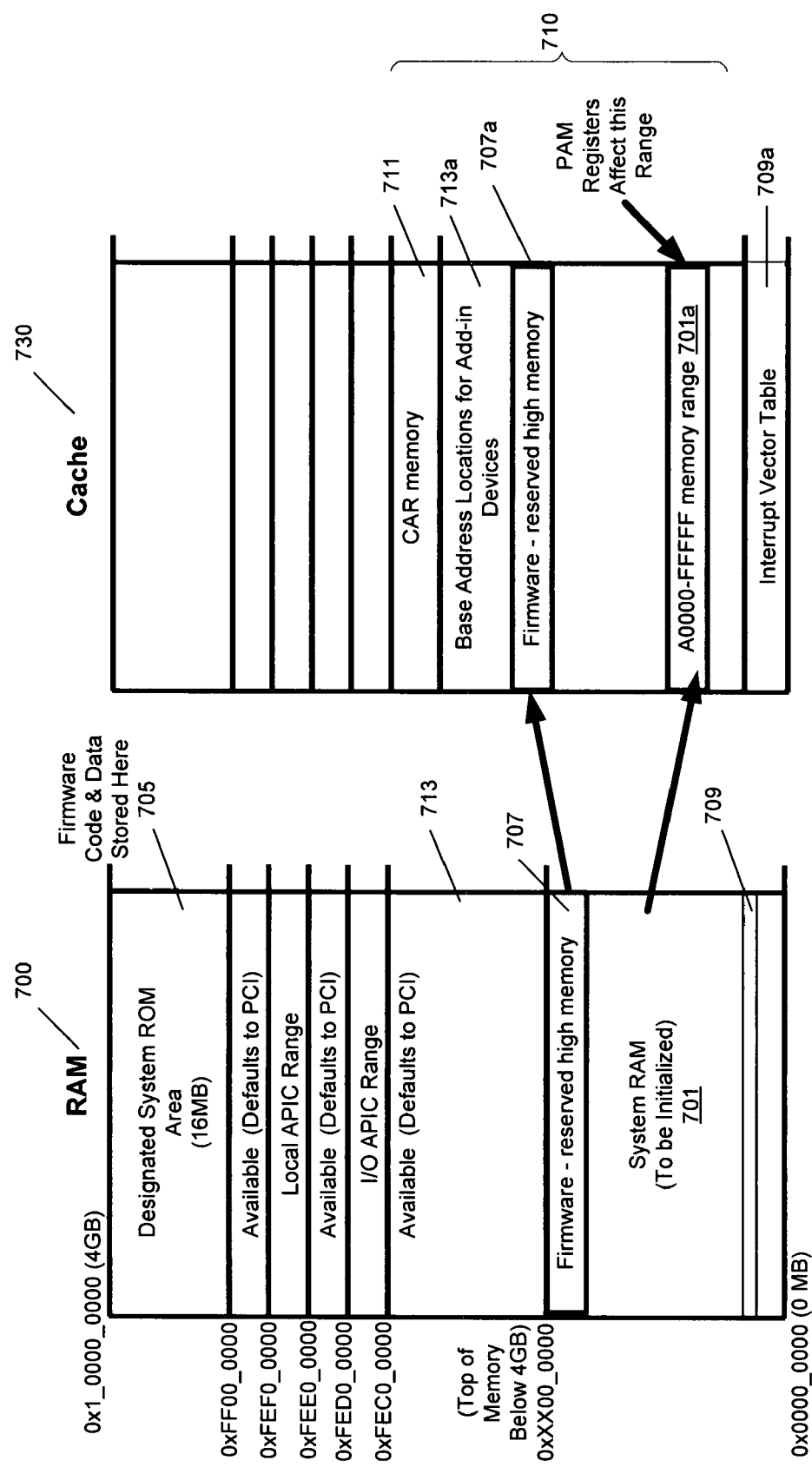
FIG. 6A illustrates a mapping of data in RAM to data in CAR, according to an embodiment of the invention.

FIG. 6A illustrates a mapping of data in RAM to data in CAR, according to an embodiment of the invention. Firmware code 707 in RAM is mapped to an area of cache 730 known as cache as RAM (CAR) 710 at 707*a*. Areas of system memory (RAM) 701 that are typically used for initializing the video subsystem may be mapped to CAR memory range A0000-FFFFF 701*a*. The interrupt vector table 709, which is typically in lower memory, is mapped to CAR 709*a*. The base address locations (BARs) in RAM 713 may point to other locations in 713. However, in embodiments of the invention, the BARs are remapped to point to CAR 713*a*, based on the PAMs 326 redirecting memory access to the cache memory 730. The data mapped to memory in CAR 713*a* is typically used for add-in devices. CAR memory 711 may be used as a memory scratch-pad to enable passing data through a stack. For instance, 'C' calls typically pass information through a stack (which is backed by memory) versus passing data through registers which has limitations in size/etc. The PAM registers 326 are set to map RAM to CAR 701*a* so that any device that typically accesses RAM to run will instead use the memory in the CAR.

Figure 7:
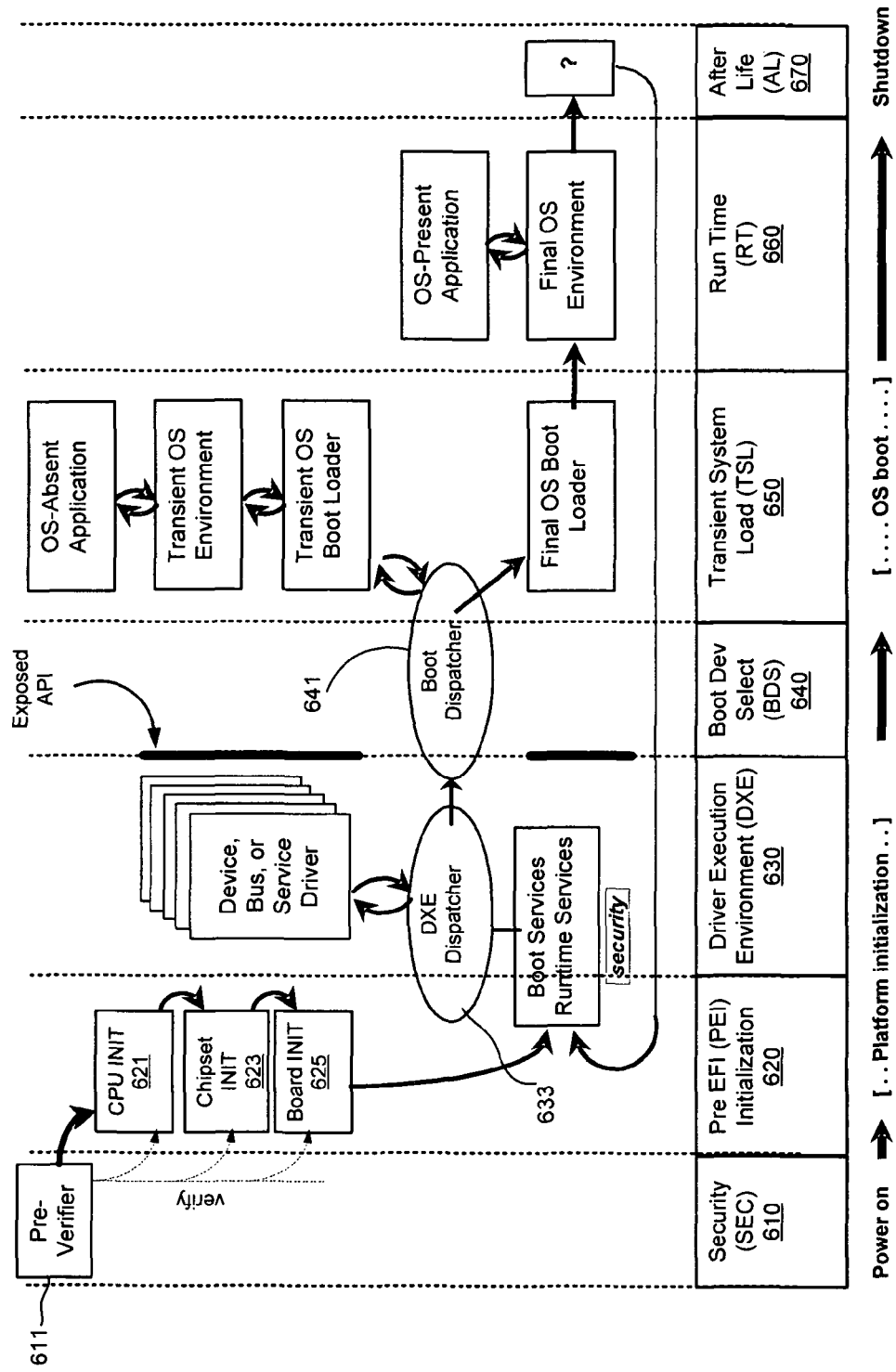
FIG. 7 is a block diagram illustrating the flow of execution of an extensible firmware interface (EFI) system according to an embodiment of the invention.

An embodiment of the invention may be implemented on a platform having extensible firmware interface (EFI) architecture. Referring to FIG. 7, there is shown a block diagram illustrating the flow of execution of an EFI system according to an embodiment of the invention. For purposes of discussion, focus will be on the processes required to boot the platform.

In existing multi-core systems, one processor is chosen to boot the platform, called the boot strap processor (BSP). Upon boot, the BSP will serially perform all boot tasks. Typically, in a platform having an extensible firmware interface (EFI) architecture, the security processing (SEC) 610 phase is executed during early boot.

A pre-verifier, or Core Root of Trust for Measurement (CRTM) 611 may be run at power-on at SEC phase 610. A pre-verifier is typically a module that initializes and checks the environment. In existing systems, the pre-verifier and SEC phase is the Core Root of Trust for Measurement (CRTM), namely enough code to startup a Trusted Platform Module (TPM) and perform a hash-extend of BIOS. More information on TPMs may be found at URL www*trustedcomputinggroup*org. The processor 621, chipset 623 and board 625 may be initialized in the PEI stage 620. Board init 625 is responsible for basic initialization of the baseboard components and finding and initializing system memory (RAM). Once system memory is initialized, the BIOS may be copied to system RAM from Flash and execute from RAM. The driver execution environment (DXE) dispatcher 633 is launched at the end of the PEI phase 620 to commence the DXE phase 630, typically by a module named DxeIpl. However, the DXE dispatcher cannot be launched until system RAM is found and initialized. Note that periods have been replaced with asterisks in URLs in this document to avoid inadvertent hyperlinks.

In embodiments of the invention, the operations at the PEI phase 620 may be run from cache as RAM (CAR) before proceeding to the driver execution environment (DXE) phase 630. The DXE dispatcher launches the boot dispatcher 641 at the boot device select (BDS) phase. The OS boots at the transient system load (TDL) stage 650.

The boot device select (BDS) phase 640 is responsible for choosing the appropriate operating system. Upon a system failure during OS runtime (RT phase 660), such as what is referred to as BSOD (Blue Screen Of Death) in Windows® or Panic in Unix/Linux, the firmware PEI and DXE flows may be reconstituted in an after life (AL phase 670) in order to allow OS-absent recovery activities.

In existing systems, video initialization could not begin until at least the DXE phase 630, waiting for system RAM to be found and initialized. In embodiments of the invention, video initialization may be performed in the PEI phase 620, using cache as RAM (CAR).

Figure 8:
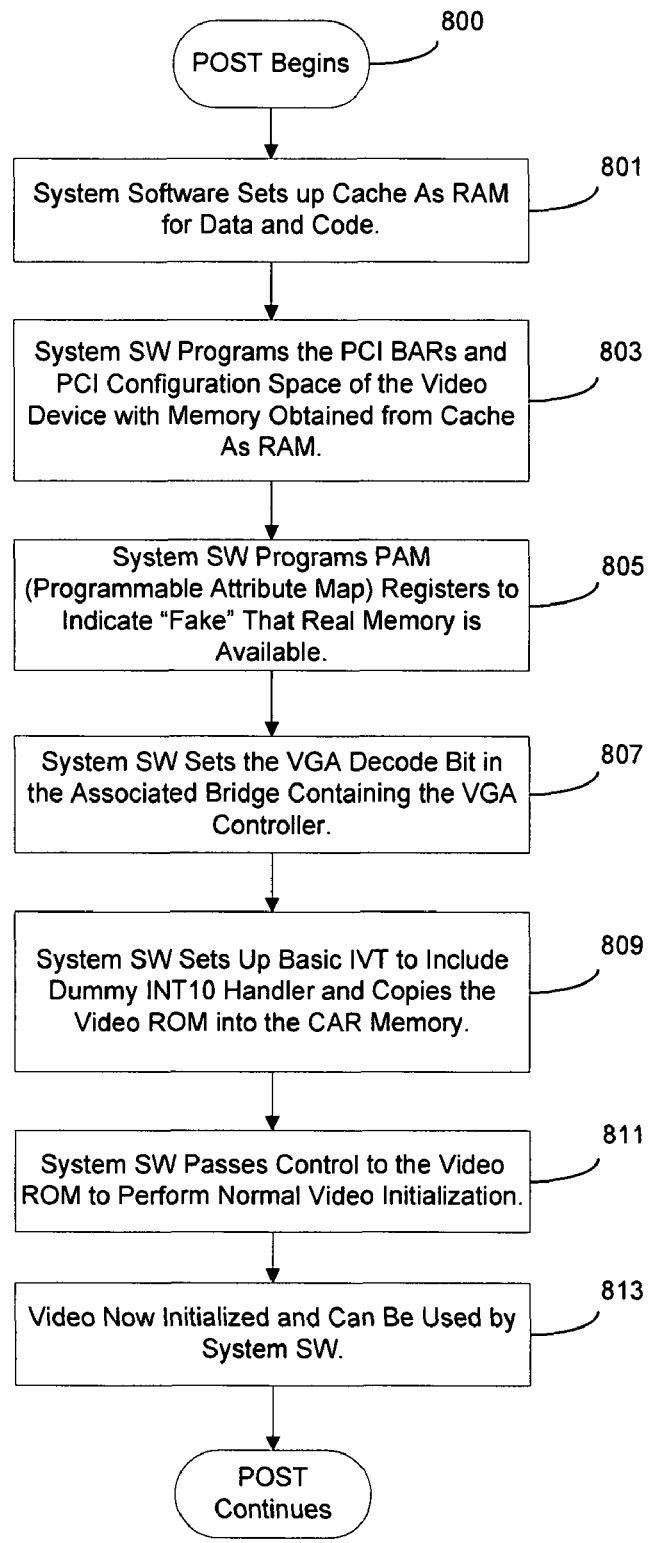
FIG. 8 is a flow diagram illustrating an exemplary method for using Cache as RAM (CAR) to initialize a video subsystem, according to an embodiment of the invention.

FIG. 8 is a flow diagram illustrating an exemplary method for using CAR to initialize a video subsystem. In an embodiment, a platform begins to boot from Flash memory, as usual. Power on Self Test (POST) operations begin at block 800. The system software (BIOS) sets up Cache as RAM (CAR) in block 801. During the early POST process, processor cache is configured to cache a portion of the BIOS image, typically the PEI portion, from Flash memory, and put the image into the CAR (707*a*). In this case, the RAM used is fast cache memory (710) and not system RAM (700), or DIMMs. Specifically, the cache as RAM is configured to contain the firmware high memory instructions and data (707*a*) and a portion of memory 713*a* to use to cache the option-ROM data from the video card. In an embodiment, the system software then programs the PCI base address registers (BARs) and PCI configuration space of the video device with memory obtained from the CAR, in block 803.

In order to initialize the video, the programmable attribute map (PAM) registers (326) must be enabled to allow the video initialization to decode certain regions of memory. The system software programs the PAM registers (326) to indicate that real memory is available, in block 805. PAM registers (326) may reside on a memory controller hub (MCH) or input/output hub (IOH) 326, as shown in FIG. 3A. The memory controller hub includes internal registers that control the address space mapping ("PAM registers"). These registers control whether the address generator looks to nonvolatile memory for instructions and data or looks to main memory. Alternately, the PAM registers (326) may reside in the IOH (325), as shown in FIG. 3A and control whether the address generator looks to the nonvolatile memory in the FWH (329) for instructions and data or looks to main memory (321). In order to force the video subsystem to look in CAR, the pointers in the PAM point to the cache as RAM instead of nonvolatile memory or system RAM, and the video device is fooled. The system software sets the VGA decode bit in the associated bridge containing the VGA controller, in block 807. An interrupt vector table (IVT) is set up to include a dummy INT10 handler and the video ROM is copied into CAR memory, in block 809. When control is passed to the video card, it will use the BAR memory allocation and will shadow itself in a traditional segment of memory which it believes to be traditional RAM. A traditional segment of memory may be in the memory map below 1 MB having an address of 0xC0000 or 0xD0000 ("C" or "D" segment, roughly 786K memory address). When a video card shadows itself, the video card takes contents from its own mapped Flash content and moves it to this "C" or "D" segment. This reflects legacy allocations of memory where add-in devices try to shadow content within certain legacy regions below the 1 MB memory range.

This memory (707*a*) is assigned by the BARs. Once the new memory mapping and interrupt vector tables and handlers have been shadowed to cache (709*a*), control may pass to the option-ROM of the video card which will now run from the CAR 713*a* During initialization, the option-ROM will access only cache memory, rather than system RAM. As soon as video initialization (video synch) is complete, in block 813, a connected video monitor will become operational. When the video card attempts to access memory, all memory accesses will be redirected to the cache memory instead of system RAM.

Once the system RAM has fully initialized, typically at the end of power on self test (POST), cached memory and firmware functions are copied back to system memory and the BARs, interrupt vectors and PAMs are reset to map memory accesses to system RAM, or physical DIMMs. At this time, BIOS will be copied to RAM from Flash memory. Before the BIOS is copied into system memory, variables created in the cache must also be copied to system memory. Specifically, the state and video memory currently residing in CAR is copied to real memory (RAM) that has been found and initialized by the BIOS. The value of the interrupt vector table INT10 handler is copied to RAM and used to set up the real vector table. The memory type range registers (MTRRS) in the MCH are set to disable caching on memory ranges. Thus, the cache is invalidated. The MTRRs are set up for normal operation from RAM and POST continues.

In embodiments, the processor is configured to reserve a portion of cache 730 to be used as cache as RAM 710. This architecture prohibits cache flushing of this portion of cache.

Other embodiments of platforms having a system processor with sufficient cache memory may also be implemented. It will be understood that the exemplary embodiment shows a platform having multiple processors and multi-cores using a point to point interconnect architecture. However, other platform architectures may implement embodiments of the present invention.

Referring again to FIG. 4, in a platform having a pTp architecture, significant initialization of the pTp interconnects must be performed during boot. In an embodiment, the video initialization is performed before the pTp interconnect initialization. For instance, processor 410 is identified as the BSP. The cache coupled to the BSP 410 will be used to mimic the system memory that would typically be used for video subsystem initialization. Communication paths will be directly from the processor 410 through the IOH 450 and ICH 460 to the video card 480.

In other multi-processor systems, the BSP may be selected based on which processor wins the race to access a given register, upon power-on. The winner is identified as the BSP and will perform boot tasks, including the cache as RAM implementation, as discussed above. In multi-processor platforms, it is important to consistently use the cache in the BSP as cache as RAM for video initialization.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for early video subsystem initialization, comprising:
    a processor coupled to cache memory;
    system random access memory (RAM) communicatively coupled to the processor;
    a firmware hub coupled to the processor comprising firmware memory having firmware code comprising a basic system input output system (BIOS) stored thereon;
    a video console communicatively coupled to the processor via a video subsystem component;
    a first portion of the cache memory to be used as cache as RAM (CAR) and store a first portion of the BIOS, a second portion of BIOS code comprising an interrupt vector table and interrupt handlers for communication to the video subsystem component, and option-ROM initialization code retrieved from the video subsystem component,
    wherein during boot up process, the video subsystem component is to execute the initialization code from the cache memory before system RAM has been initialized, and wherein the interrupt vector table includes a dummy handler to enable operation of the video subsystem prior to initialization of system RAM.

2. The system as recited in claim 1, wherein the processor is a boot strap processor (BSP) in a platform having a multi-processor architecture.

3. The system as recited in claim 1, wherein the processor is identified as a boot strap processor (BSP) in a platform having a point to point (pTp) interconnect, multi-processor and multi-core architecture, wherein the video subsystem is initialized prior to completing initialization of the pTp interconnect components.

4. The system as recited in claim 1, wherein the BIOS conforms to an extensible firmware interface (EFI) architecture and video subsystem initialization is performed during a pre-EFI initialization (PEI) stage during boot up.

5. The system as recited in claim 1, wherein once initialized, the video console is available to display status messages relating to the boot up process, including status relating to system RAM initialization.

6. A method for speeding video initialization in a platform, comprising:
    configuring a portion of cache memory as cache as RAM (CAR), during power on self test (POST) at boot process time;
    configuring a portion of CAR for storing a portion of firmware code;
    storing video subsystem initialization code in a portion of CAR;
    commencing execution of the video subsystem initialization code from CAR during POST, before system RAM has been initialized, wherein the video subsystem initialization code accesses CAR instead of system RAM, wherein an interrupt vector table is generated to include a dummy handler to enable operation of the video subsystem prior to system RAM initialization;
    copying video subsystem code and firmware code from CAR to appropriate locations in system RAM; and
    completing the boot process.

7. The method as recited in claim 6, wherein the platform comprises a plurality of processor and cores, one processor being designated as the boot strap processor (BSP), and wherein the cache used for cache as RAM is coupled to the BSP.

8. The method as recited in claim 7, wherein the platform conforms to a point to point interconnect architecture.

9. The method as recited in claim 6, wherein the platform conforms to an extensible firmware interface (EFI) architecture, further comprising:
    completing execution of the video subsystem initialization code prior to commencing a driver execution environment (DXE) phase of the boot process.

10. The method as recited in claim 6, wherein configuring a portion of cache further comprises:
 setting programmable attribute registers to map memory accesses to cache memory;
 programming base address registers to map to portions of cache memory;
 generating a copy of an interrupt vector table and storing the table in cache memory at a zero location, wherein mapping memory accesses to cache memory forces use of the copied table.

11. The method as recited in claim 6, further comprising:
 providing visual status of the boot process on a video console associated with the video subsystem during the boot process, before system RAM has initialized.

12. A machine accessible non-transitory storage medium for speeding video initialization in a platform, the medium having instructions stored therein that when executed on a machine cause the machine to:
 configure a portion of cache memory as cache as RAM (CAR), during power on self test (POST) at boot process time;
 configure a portion of CAR for storing a portion of firmware code;
 store video subsystem initialization code in a portion of CAR;
 commence execution of the video subsystem initialization code from CAR during POST, before system RAM has been initialized, wherein the video subsystem initialization code accesses CAR instead of system RAM, wherein an interrupt vector table is generated to include a dummy handler to enable operation of the video subsystem prior to system RAM initialization;
 copy video subsystem code and firmware code from CAR to appropriate locations in system RAM; and
 complete the boot process.

13. The medium as recited in claim 12, wherein the platform comprises a plurality of processors and cores, one processor being designated as the boot strap processor (BSP), and wherein the cache used for cache as RAM is coupled to the BSP.

14. The medium as recited in claim 13, wherein the platform conforms to a point to point interconnect architecture.

15. The medium as recited in claim 12, wherein the platform conforms to an extensible firmware interface (EFI) architecture, further comprising instructions to:
 complete execution of the video subsystem initialization code prior to commencing a driver execution environment (DXE) phase of the boot process.

16. The medium as recited in claim 12, wherein configuring a portion of cache further comprises instructions to:
 set programmable attribute registers to map memory accesses to cache memory;
 program base address registers to map to portions of cache memory;
 generate a copy of an interrupt vector table and storing the table in cache memory at a zero location, wherein mapping memory accesses to cache memory forces use of the copied table.

17. The medium as recited in claim 12, further comprising instructions to:
 provide visual status of the boot process on a video console associated with the video subsystem during the boot process, before system RAM has initialized.

\* \* \* \* \*